Dec. 2, 1969  A. C. KECK ET AL  3,482,128
DYNAMOELECTRIC MACHINE HAVING A VERSATILE ELECTRICAL
CIRCUIT-MAKING UNIT
Filed May 8, 1967  2 Sheets-Sheet 1
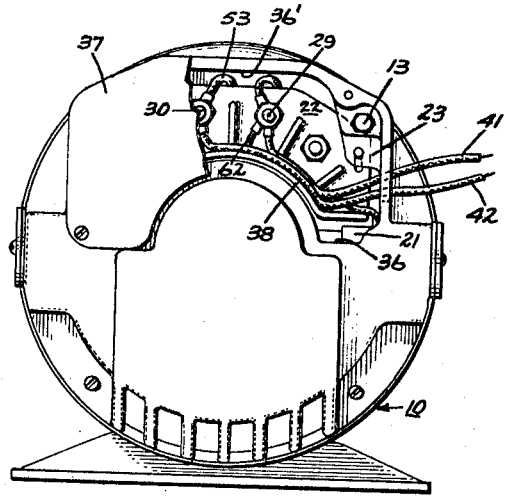
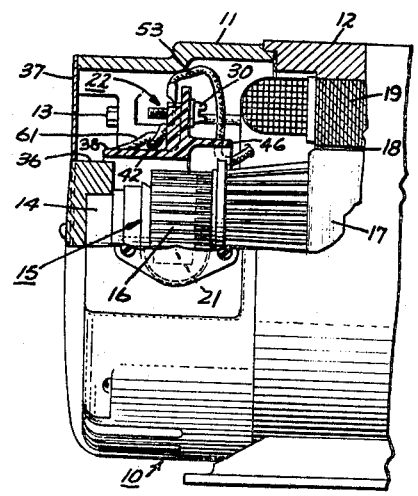
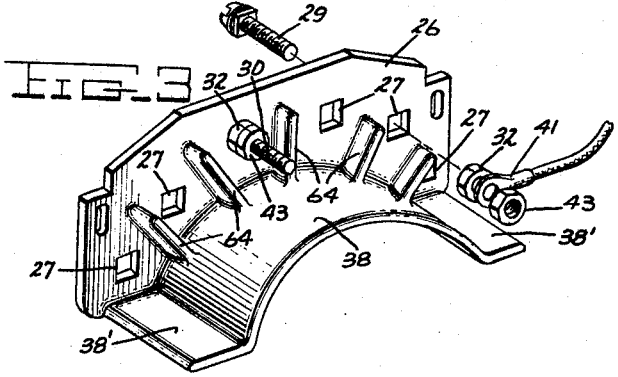
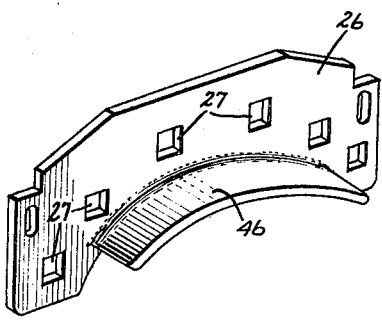
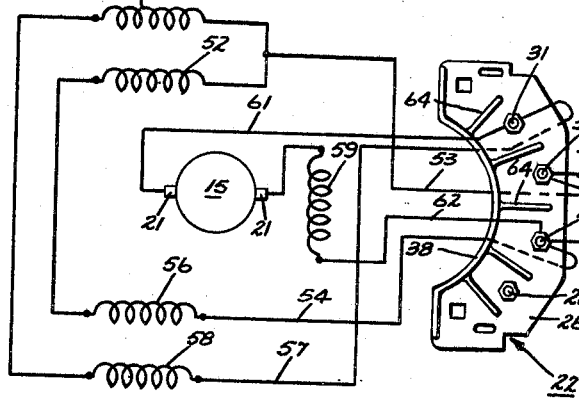
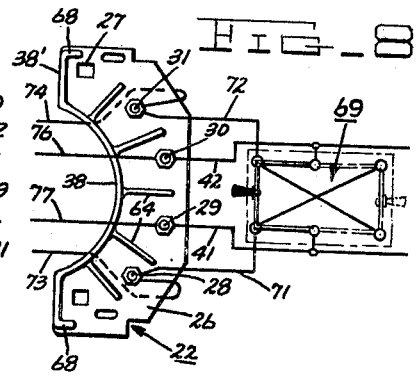
Inventors:
Arthur C. Keck,
Stanley E. Tomkinson,
by John M. Stoudt
Attorney.

Dec. 2, 1969  A. C. KECK ET AL  3,482,128
DYNAMOELECTRIC MACHINE HAVING A VERSATILE ELECTRICAL
CIRCUIT-MAKING UNIT
Filed May 8, 1967  2 Sheets-Sheet 2
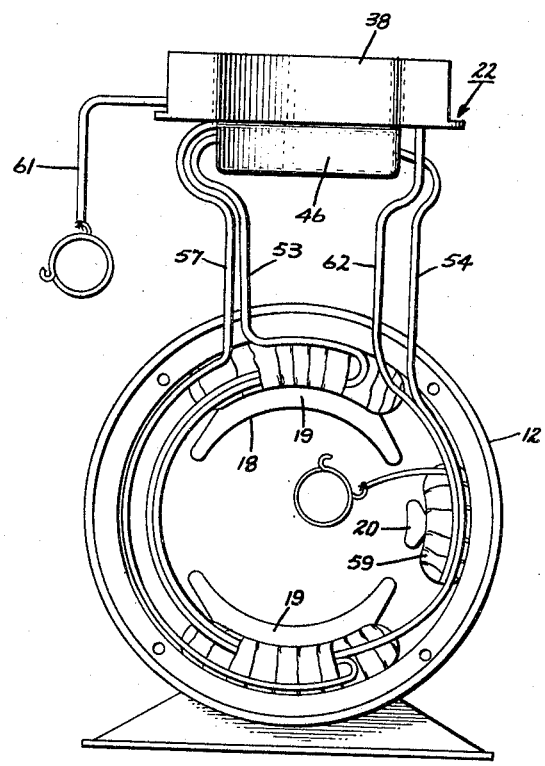
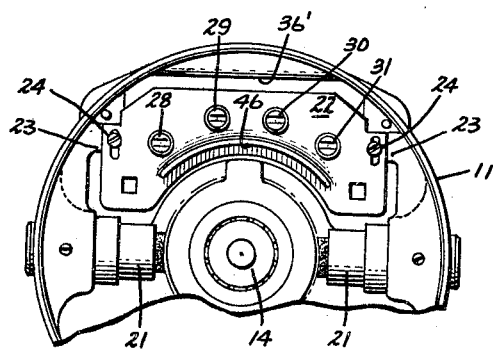
Inventors:
Arthur C. Keck,
Stanley E. Tomkinson,
by John M. Stoudt
Attorney.

United States Patent Office 3,482,128
Patented Dec. 2, 1969

3,482,128
DYNAMOELECTRIC MACHINE HAVING A VERSATILE ELECTRICAL CIRCUIT-MAKING UNIT
Arthur C. Keck and Stanley E. Tomkinson, Fort Wayne, Ind., assignors to General Electric Company, a corporation of New York
Filed May 8, 1967, Ser. No. 636,827
Int. Cl. H02k 11/00, 5/10
U.S. Cl. 310—71                                       7 Claims

ABSTRACT OF THE DISCLOSURE

A dynamoelectric machine has a versatile electrical circuit-making unit formed with one wall carrying a number of terminals, which extend toward an opening in the frame. A ledge is formed between the frame opening and the terminals by a second wall, attached at one end to the one wall positioned over part of the rotatable assembly. The one wall also has projections disposed between adjacent terminals. This arrangement provides a separation of the terminal ends of leads connected to the terminals, keeps the leads from interfering with the rotatable assembly, and catches inadvertently dropped objects, such as lead connectors, which might otherwise fall into the machine interior during the making of connections.

Background of the invention

The present invention relates to a dynamoelectric machine having a versatile electrical circuit-making unit and in particular to dynamoelectric machines having such units which are capable of economical use in a number of different kinds of machines.

In the construction of dynamoelectric machines, it is highly desirable from the standpoint of efficiency, economy and convenience to furnish a common location, accessible to some extent from the exterior of the machine, for making internal machine electrical component and external power circuit connections. Generally speaking, a number of threaded terminal studs having threaded connectors thereon are mounted at spaced apart locations on a so-called terminal board designed for use in a particular kind of machine, such as a dual-voltage alternating current induction motor. The arrangement disclosed in the G. D. Willits U.S. Patent 2,442,227 is representative of this approach.

It is especially desirable to provide an improved electrical circuit-making unit which is capable of use with many different kinds of machines, such as either direct current or alternating current motors, without necessitating extensive modification. It is further desirable that the arrangement be easily installed in the machine and disassembled therefrom and permits swift and efficient making as well as a subsequent altering of connections with the proper circuit. The arrangement should additionally tend to impede connectors from being inadvertently dropped or otherwise falling into generally inaccessible interior regions of the machine during the making of circuit connections and to prevent electrical conductors or wires being connected in circuit from coming into contact and interfere with rotating parts of the machine, such as an armature and commutator assembly in a DC electric motor. These desirable features should be attained by a versatile construction which is still economical to manufacture in mass production quantities.

It is therefore a primary object of the present invention to provide an improved dynamoelectric machine having a versatile electrical circuit-making unit and a more specific object to provide an arrangement which has at least a majority of the desirable features mentioned above.

It is a further object of the present invention to provide an improved dynamoelectric machine of the direct current type with an economical and accessible circuit-making unit which tends to prevent connectors from inadvertently falling into the interior of the machine and electrical conductors being connected in circuit from interfering with proper rotation of the armature and commutator assembly.

It is yet another object to provide an improved and versatile electrical circuit-making unit especially adapted for use in dynamoelectric machines which achieves at least some of the desirable results previously discussed.

Summary of the invention

In carrying out the objects in one form we provide an improved dynamoelectric machine having an electrical circuit-making unit for efficiently making internal machine electrical component and external power circuit connections. Considering a dynamoelectric machine of the direct current type, the unit is removably mounted by the machine frame between a pair of brush assemblies over a part of the armature and commutator assembly. The unit includes a molded electrical insulating member having a first wall carrying a number of spaced apart terminals which extend away from the outboard side of the wall to be accessible externally of the machine through a flanged opening in the frame. A second wall has one end joined to the first wall, with the other end terminating in overlapped relation with the frame flange at the opening. In addition, the second wall has a pair of separated flat sections connected together by a curved intermediate section which fits above the commutator.

With this construction, the second wall forms a ledge or tray and in particular a closed channel between the terminals and frame opening over the commutator, which in turn serves to maintain electrical conductor leads connected to the terminals from interfering with the rotatable assembly. It also functions to catch and retain inadvertently dropped objects, such as electrical connectors if such are used, thus preventing them from falling into the interior regions of the machine and making them readily available for their intended use. In the illustrated form, the first wall also carries a third wall, radially offset from the second wall, projecting toward the side face of the stator over a part of the rotatable assembly. This latter wall aids in the prevention of leads from coming into contact with the rotatable assembly. Moreover, a number of projections (e.g., ribs) are formed on the outboard side of the first wall, between adjacent terminals, to provide separated terminal locations and act as barriers between the terminals to insure electrical isolation of the individual terminals and the leads connected thereto, one from the other. They also augment the stiffness of the one wall, especially desirable when the insulating member is fabricated from molded material.

In addition to the advantageous features already mentioned, the arrangement is quite versatile in nature, being capable of utilization with any number of different circuit connections and kinds of machines. It also is easily installed and permits the swift and efficient making and subsequent alteration of circuit connections. These benefits are furnished by an inexpensive construction which may be fabricated by mass production manufacture techniques.

The subject matter which we regard as our invention is particularly pointed out and distinctly claimed in the concluding portion of this specification. Our invention, itself, however, both as to its organization and method of operation, together with further objects and advantages thereof may best be understood by reference to the following description taken in connection with the accompanying drawings.

Brief description of the drawings

FIGURE 1 is an end view, partially broken away, of a dynamoelectric machine of the direct current type incorporating the preferred form of the present invention;

FIGURE 2 is a partial elevational side view, partly broken away to show details, of the dynamoelectric machine seen in FIGURE 1;

FIGURE 3 is an enlarged view in perspective of the terminal insulating member of the electrical circuit-making unit for the dynamoelectric machine of the exemplification, showing the outboard or exterior-facing side of the member and several terminal studs;

FIGURE 4 is an enlarged view in perspective of the inboard or interior-facing side of the terminal insulating member shown in FIGURE 3;

FIGURE 5 is an end view, partially in exploded form, of the stator assembly and electrical circuit-making unit for the machine of the exemplification;

FIGURE 6 is a partial internal end view of the dynamoelectric machine end frame illustrated in FIGURES 1 and 2, revealing the electrical circuit-making unit mounted in place;

FIGURE 7 is a schematic circuit diagram for the electrical circuit-making unit connected in circuit with the electrical components of the DC dynamoelectric machine of the exemplification; and FIGURE 8 is a schematic circuit diagram of basically a circuit-making unit essentially similar to that seen in the previous figures, the unit being adapted for connection in a second dynamoelectric machine electrical circuit.

Description of the preferred embodiments

Turning now to the drawings in more detail, one form of the present invention is illustrated as being incorporated in an improved direct current type two pole constant speed dynamoelectric machine in the form of a compound-wound motor, generally indicated by numeral 10. The frame of the motor includes a pair of cast end frames (one being identified in FIGURES 1, 2, and 6 by numeral 11) secured to a central housing 12 by standard through-bolts 13. Each end frame carries a ball bearing 14 in the usual way having an inner race secured to rotate with the rotatable assembly 15 of the machine. Assembly 15 as illustrated is a conventional commutator and armature assembly having a commutator 16 suitably fastened to a central shaft and a wound armature 17, a circuit with the commutator, positioned in the stator bore 18 formed by two diametrically opposed magnetic poles 19 and a single interpole 20. Housing 12, which has magnetic properties, serves as the yoke of the stator and carries poles 19 and interpole 20 in the manner best seen in FIGURE 5. End frame 11 also mounts a pair of generally opposed brush assemblies 21 (FIGURE 6) which cooperate with the circumferential brush track of commutator 16 during operation of the machine. The parts of the machine briefly outlined above are standard in construction and have been used by way of exemplification for the purpose of disclosing the preferred form of the present invention.

The preferred arrangement in which the dynamoelectric machine of the exemplification incorporates an electrical circuit-making unit, generally denoted by numeral 22, will now be considered. The unit is removably mounted onto a pair of spaced apart embossments or platforms 23 of end frame 11 by screws 24, angularly between the brush assemblies 21. In the preferred form, unit 22 comprises an electrical insulating member, molded from high temperature thermo-responsive material such as thermosetting epoxy resin, which has a first wall 26 disposed upright, generally normal to the axis of rotation for the machine directly over commutator 16. Wall 26 is formed with a number of angularly spaced apart holes 27 (six being shown in the illustrated embodiment) for mounting a number of terminals which project entirely through the wall in an axial direction. As illustrated, only four terminals are employed, identified by numerals 28–31 inclusive with terminal 28 being an unused one. The terminals are furnished in the form of identical terminal studs having a generally square section fitting into holes 27 of complementary configuration to prevent turning of the terminals as electrical connections are being made thereto. They are firmly mounted to wall 26 between an enlarged head having a transverse screw driver receiving slot and its thread, by standard nuts 32 (FIGURE 3). Thus, the screw threads extend beyond the outboard side of wall 26 toward an enlarged and flanged opening 36 provided in end frame 11 to permit ready access to the exposed terminal threads from a location externally of the machine. A suitable cover plate 37 may be removably attached over the opening to close the machine at that place.

A second wall 38 is integrally joined at one end to the outboard side of wall 26 and terminates at the other end in a free edge which overlaps a complementary shaped region of the flanged opening 36. In the illustrated embodiment, wall 38 is defined by a pair of spaced apart flat tray-like sections 38' integrally joined together by an intermediate curved section arranged to fit over the commutator in closely spaced relation thereto. With this arrangement, wall 38 in effect forms a ledge or shelf and more specifically a closed channel between a location immediately beneath the terminals and a second location directly over the end frame region previously mentioned. Thus, as best seen in FIGURES 1 and 2, this construction serves to maintain electrical conductor leads such as input power or external line leads 41, 42 from interfering with the rotatable assembly. These leads enter the machine through an aperture provided in the side of end frame 11 in the vicinity of section 38'. Wall 38 additionally acts as a ledge to catch and hold or retrieve objects, such as terminal connector nuts 43, to prevent their falling into the generally inaccessible interior regions of the machine. A third wall 46, radially offset from the second wall (FIGURES 4 and 6) is integrally joined to wall 26 beneath the terminal heads on the inboard side of the unit and extends toward the end face of the stator, passing over a portion of the circumferential length of the commutator 16. Internal conductor leads are prevented from coming into contact with the rotatable assembly by wall 46.

By way of illustration, to show the advantages of the above arrangement in the exemplification as seen in FIGURE 7, two coils 51, 52 of separate field windings are connected on one side to the outboard side of terminal 30 by conductor lead 53 which extends over wall 26 through the space between the upper edge of wall 26 and the upper region 36' of opening 36. In a like manner, conductor lead 54 connects one side of a second coil 56 of one field winding to the outboard thread of terminal 29 while conductor 57 places the second coil 58 of the other field winding in circuit with terminal 31, across wall 26. It should be noted from FIGURE 7 that the brush assemblies and interpole coil 59 are in circuit between terminals 31, 29 through leads 61, 62 which are in the vicinity of the outboard side of wall 26 by virtue of the position of unit 22 in frame 11 having brush assemblies 21. Consequently, coils 51, 58 of one field winding are in series circuit relation with interpole coil 59 and the armature circuit across output terminals 29, 30. On the other hand, coils 52, 56 of the second field winding in parallel with the armature circuit between the same output terminals. In this construction, wall 38 will act to maintain external leads 41, 42 and internal leads 61, 62 away from the rotatable assembly while wall 46 achieves this purpose for internal leads 53, 54 and 57.

It should be noted at this time from FIGURES 3 and 7 that a number of angularly spaced apart, generally radial projections or ribs 64 is integrally joined to the outboard side of wall 26. These ribs extend from wall 38 and terminate between adjacent terminals to provide barriers or separated terminal locations to insure electrical isolation of the individual terminals and the leads connected thereto, one from the other. They also tend to augment the stiffness and strength of both walls 26 and 38, especially desirable when the insulating member is fabricated with relatively thin walls from molded insulating material for reasons of economy and compactness. For example, in actual practice, insulating members were molded with the following nominal dimensions (in inches):

|  | Inches |
|---|---|
| Overall transverse width | 4.25 |
| Overall height | 1.97 |
| Thickness of walls 26, 38, 46 | 0.12 |
| Axial length of walls 38, 46 | 0.88 |
| Axial length of ribs 64 | 0.25 |

Unit 22 may be installed into end frame 11 either before the leads are connected to the individual terminals or subsequent to the attachment of selected leads onto the terminals. In the interest of saving labor and time, it is easier to connect certain of the internal leads to the terminals of the unit, as seen in FIGURE 5, prior to its assembly onto platforms 23 in end frame 11. If the circuit connections with the internal electrical components of the machine are to be made in a permanent relation, the terminal ends of the leads to these components may be made to the inboard sides of the terminals (slot in the terminal head), such as by soldering or the like after the terminal studs have been mounted to wall 26. Thereafter, end frame 11 having unit 22 in place may be assembled onto housing 12.

FIGURE 8 shows essentially the same electrical circuit-making unit 22 revealed in the first seven figures, differing therefrom by the provision of unstanding ridges 68 on sections 38 thereby providing pockets to catch and retain objects dropped onto wall 38 for subsequent use. This pocket, if desired, may be formed more positively by section 38' by fabricating the section with a generally concave cross-section in a transverse direction. In other respects, unit 22 of FIGURE 8 is similar to that already disclosed; however, in the schematic presentation in FIGURE 8, it is used for making dynamoelectric machine circuits which differ from that of FIGURE 7 to illustrate the versatility and flexibility of the unit.

In the electrical circuit shown in FIGURE 8, an external double-pole, double-throw switch 69 of common construction, has the movable switch arm connected between a suitable power source and input terminals 29, 30, through leads 41, 42. Conductors 71, 72 are in circuit between one set of switch poles and terminals 28, 31 which are in turn in circuit with internal leads 73, 74 connected to the windings (not shown) of the motor, whether an AC or DC machine. Internal conductors or leads 76, 77 serially connect either the other side of the same windings to terminals 29, 30 or another set of windings to those terminals. It is therefore simple to reverse rotation of the machine merely by operation of the switch from the illustrated position to the broken line position thereby reversing current flow through the windings.

When an alternating current induction type dynamoelectric machine incorporates unit 22, it may be mounted in the same relationship with respect to the end frame of the machine. Assuming that the machine has a rotatable assembly of the type disclosed in U.S. Patent 3,235,756 of K. V. Andersen issued Feb. 15, 1966, the insulated member of the unit may be supported such that curved wall 46 may be positioned directly over and in close proximity to the fan blades or the like carried by the rotor, thereby serving as part of a stationary cooling fluid or air guide for the blades in the circulating system of the machine.

Consequently, it should be apparent to those skilled in the art, while we have shown and described what at present is considered to be the preferred embodiments of our invention in accordance with the patent statutes, it is to be understood that modifications can be made without actually departing from the true spirit and scope of this invention. We therefore intend to cover in the following claims all such equivalent variations that fall within the invention.

What we claim as new and desire to secure by Letters Patent of the United States is:

1. A dynamoelectric machine comprising a frame supporting a rotatable assembly and stator therein for relative rotation; and an electrical circuit-making unit removably mounted over said rotatable assembly adjacent one end of said stator in the frame, said unit including an insulating member having a first wall carrying a number of spaced apart terminals for making circuit connections extending away from an outboard side of the wall and the stator, and a second wall joined at an end to said first wall at the outboard side thereof and beneath said terminals forming a ledge between the rotatable assembly and the terminal studs for preventing at least some of the electrical conductor leads connected to the terminals from interfering with the rotatable assembly and for catching any object which may be inadvertently dropped as the conductor leads are being connected in circuit.

2. The dynamoelectric machine of claim 1 in which the outboard side of said insulating member includes a number of projections between adjacent terminals forming barriers to provide separated locations for receiving the terminal ends of conductor leads at the adjacent terminals and to augment the stiffness of said first wall.

3. The dynamoelectric machine of claim 1 in which the frame is formed with an opening therethrough to provide access to the terminals of the unit and with a flange positioned next to a portion of said second wall in overlapping relation therewith to insure a closed channel disposed over the rotatable assembly extending axially between the opening and the terminals.

4. The dynamoelectric machine of claim 1 in which an inboard side of the first wall facing the stator mounts a third wall extending toward the stator forming a ledge to aid in maintaining at least some of the electrical conductor leads, connected to the terminals, out of interference with the rotatable assembly.

5. The dynamoelectric machine of claim 4 in which the rotatable assembly includes an armature and commutator, and the frame supports at least two angularly spaced apart brush assemblies for cooperation with said commutator, and said unit is mounted in the frame between said at least two angularly spaced apart brush assemblies, with the second wall of the unit extending over a portion of said commutator.

6. An electrical circuit-making unit for use in a dynamoelectric machine having a rotatable assembly and a stator comprising an insulating member having first wall formed with a number of spaced apart openings to accommodate terminals, and a number of projections extending away from the wall between adjacent openings to provide separated compartments for the terminals; and a second wall having one end joined to the first wall beneath the openings and projections to form a ledge adapted to receive conductor leads and objects which may be dropped as the leads are being connected to the terminals.

7. The unit of claim 6 in which the member is molded and the second wall of the insulating member includes a pair of spaced apart sections adapted to retain objects, and an intermediate curved wall section connecting the pair of sections together adapted to extend over the rotatable assembly of the machine.

References Cited
UNITED STATES PATENTS

| | | | |
|---|---|---|---|
| 2,673,300 | 3/1954 | Furnas | 310—71 |
| 2,797,080 | 6/1957 | Johnson | 200—80 |
| 2,808,525 | 10/1957 | Beckett | 310—91 |
| 3,012,159 | 12/1961 | Druesedow | 310—71 |
| 3,194,994 | 7/1965 | Latta | 310—68 |
| 3,225,232 | 12/1965 | Turley | 310—50 |
| 3,250,929 | 5/1966 | Maier | 310—68 |
| 3,299,303 | 1/1967 | Newill | 310—66 |
| 3,311,764 | 3/1967 | Linkous | 310—68 |
| 3,378,708 | 4/1968 | Baker | 310—68 |
| 3,356,873 | 12/1967 | Tamm | 310—66 |

J. D. MILLER, Primary Examiner

U.S. Cl. X.R.

200—80; 310—68, 85; 339—196